United States Patent
Haag et al.

(10) Patent No.: US 12,253,702 B2
(45) Date of Patent: Mar. 18, 2025

(54) OPTICAL FILM INCLUDING INFRARED REFLECTOR AND MULTILAYER REFLECTIVE POLARIZER WITH CRYSTALLINE LOW INDEX LAYERS

(71) Applicant: 3M INNOVATIVE PROPERTIES COMPANY, St. Paul, MN (US)

(72) Inventors: Adam D. Haag, Woodbury, MN (US); Matthew B. Johnson, Woodbury, MN (US); Carl A. Stover, St. Paul, MN (US); Timothy J. Nevitt, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1045 days.

(21) Appl. No.: 17/260,413

(22) PCT Filed: Jul. 9, 2019

(86) PCT No.: PCT/IB2019/055837
§ 371 (c)(1),
(2) Date: Jan. 14, 2021

(87) PCT Pub. No.: WO2020/016703
PCT Pub. Date: Jan. 23, 2020

(65) Prior Publication Data
US 2021/0302637 A1 Sep. 30, 2021

Related U.S. Application Data

(60) Provisional application No. 62/699,459, filed on Jul. 17, 2018.

(51) Int. Cl.
*G02B 5/08* (2006.01)
*B29D 11/00* (2006.01)
(Continued)

(52) U.S. Cl.
CPC .......... *G02B 5/305* (2013.01); *B29D 11/0073* (2013.01); *B32B 17/10036* (2013.01);
(Continued)

(58) Field of Classification Search
CPC ........ G02B 5/205; G02B 5/208; G02B 5/305; G02B 5/0841; G02B 5/3083;
(Continued)

(56) References Cited

U.S. PATENT DOCUMENTS

| 3,610,729 A | 10/1971 | Rogers |
| 4,446,305 A | 5/1984 | Rogers |

(Continued)

FOREIGN PATENT DOCUMENTS

| WO | WO 1995-017303 | 6/1995 |
| WO | WO 1999-039224 | 8/1999 |

(Continued)

OTHER PUBLICATIONS

Timothy J. Hebrink et al., Precision Engineering of Multi-layer Optical Film, 2015, pp. 1-5 [online], [retrieved Apr. 21, 2024], retrieved from the Internet <URL: https://www.researchgate.net/profile/Tim-Hebrink/publication/292983408_Precision_Engineering_of_Multi-Layer_Optical_Films/ . . . pdf>. (Year: 2015).*

(Continued)

*Primary Examiner* — Cara E Rakowski
*Assistant Examiner* — Wesley Scott Ashton
(74) *Attorney, Agent, or Firm* — Clifton F. Richardson; Daniel J. Iden (57) ABSTRACT

Optical films are described. In particular, optical films including a reflective polarizer portion and an infrared portion, with no adhesive between these two portions, are described. These optical films may be particularly suitable (Continued)

for combiner applications, including automotive heads up display applications with demanding ambient environments.

19 Claims, 3 Drawing Sheets

(51) Int. Cl.
| | |
|---|---|
| *B32B 17/10* | (2006.01) |
| *G02B 5/20* | (2006.01) |
| *G02B 5/30* | (2006.01) |
| *G02B 27/01* | (2006.01) |
| *G02B 27/28* | (2006.01) |

(52) U.S. Cl.
CPC .......... *B32B 17/10458* (2013.01); *B32B 17/10678* (2013.01); *G02B 5/205* (2013.01); *G02B 5/208* (2013.01); *G02B 5/3083* (2013.01); *G02B 27/0101* (2013.01); *G02B 27/283* (2013.01); *B32B 2605/08* (2013.01); *G02B 5/0841* (2013.01)

(58) Field of Classification Search
CPC .......... G02B 27/283; G02B 27/0101; B29D 11/0073; B32B 17/10036; B32B 17/10458; B32B 17/10678; B32B 2605/08

See application file for complete search history.

(56) References Cited

U.S. PATENT DOCUMENTS

| | | | |
|---|---|---|---|
| 4,540,623 A | 9/1985 | Im | |
| 5,103,337 A | 4/1992 | Schrenk | |
| 5,360,659 A * | 11/1994 | Arends | B32B 17/10018 359/359 |
| 5,448,404 A | 9/1995 | Schrenk | |
| 5,882,774 A | 3/1999 | Jonza | |
| 6,088,067 A * | 7/2000 | Willett | G02F 1/13362 349/5 |
| 6,157,490 A | 12/2000 | Wheatley | |
| 6,368,699 B1 | 4/2002 | Gilbert | |
| 6,531,230 B1 | 3/2003 | Weber | |
| 6,783,349 B2 | 8/2004 | Neavin | |
| 6,952,312 B2 | 10/2005 | Weber | |
| 7,652,736 B2 * | 1/2010 | Padiyath | G02B 5/08 349/115 |
| 7,820,297 B2 * | 10/2010 | Benson | G02B 5/0841 428/447 |
| 8,467,131 B2 * | 6/2013 | Yu | B32B 7/023 428/522 |
| 9,557,568 B1 * | 1/2017 | Ouderkirk | G02B 27/286 |
| 9,575,233 B2 * | 2/2017 | Merrill | G02B 27/28 |
| 9,630,356 B2 | 4/2017 | Neavin | |
| 2001/0011779 A1 * | 8/2001 | Stover | B29C 48/71 264/1.7 |
| 2007/0236636 A1 * | 10/2007 | Watson | G02B 6/0056 349/117 |
| 2010/0124667 A1 * | 5/2010 | Liu | G02B 5/3083 428/480 |
| 2011/0255155 A1 * | 10/2011 | Hebrink | B32B 27/32 359/359 |
| 2011/0268939 A1 * | 11/2011 | Liu | B32B 27/08 528/298 |
| 2012/0026580 A1 * | 2/2012 | Kiyoto | G02B 5/285 359/359 |
| 2012/0050847 A1 * | 3/2012 | Watanabe | C09K 19/56 359/359 |
| 2012/0162960 A1 * | 6/2012 | Lin | G02B 5/0242 362/19 |
| 2013/0279000 A1 * | 10/2013 | Maeda | B32B 17/1022 359/360 |
| 2015/0177432 A1 * | 6/2015 | Hebrink | G02B 5/208 359/359 |
| 2016/0109628 A1 * | 4/2016 | Weber | G02B 5/0816 359/359 |
| 2016/0245971 A1 * | 8/2016 | Chang | B29C 48/832 |
| 2017/0329060 A1 * | 11/2017 | Tai | G02B 5/305 |
| 2021/0294005 A1 * | 9/2021 | Swanson | G02B 5/021 |
| 2022/0019009 A1 * | 1/2022 | Edwards | B32B 17/10458 |

FOREIGN PATENT DOCUMENTS

| | | |
|---|---|---|
| WO | 2007121064 A2 | 10/2007 |
| WO | 2014022049 A1 | 2/2014 |
| WO | 2015077249 A1 | 5/2015 |
| WO | WO-2017213911 A1 * | 12/2017 ........ G02B 27/281 |
| WO | WO-2018063961 A1 * | 4/2018 ........ B32B 17/06 |
| WO | WO 2019-145860 | 8/2019 |

OTHER PUBLICATIONS

Amisha Kumari et al., Polyesters—A Review, 2017, pp. 1-24 [online], [retrieved Apr. 22, 2024], retrieved from the Internet <URL: https://www.researchgate.net/publication/332093406_Polyesters_-_A_Review>. (Year: 2017).*

Polarization, 2017, pp. 1-3 [online], [retrieved Apr. 22, 2024], retrieved from the Internet <URL: https://web.archive.org/web/20170916000453/http://labman.phys.utk.edu/phys222core/modules/m6/polarization.html>. (Year: 2017).*

Yan Li et al., Design Optimization of Reflective Polarizers for LCD Backlight Recycling, 5 Journal of Display Technology 335-340 (2009). (Year: 2009).*

White Light, 2016, pp. 1-5 [online], [retrieved May 29, 2023], retrieved from the Internet <URL: http://web.archive.org/web/20170228093003/https://byjus.com/physics/white-light/>. (Year: 2017).*

MacLeod, "Thin-Film Optical Filters", Ed. 2, Macmillan Publishing Co., 1986, Table of contents, 4pages.

Thelan, "Design of Optical Interference Filters", McGraw-Hill, Inc., 1989, Table of contents, 5pages.

Weber, "Giant Birefringent Optics in Multilayer Polymer Mirrors", Science, vol. 287, 2000, pp. 2451-2456.

International Search report for PCT International Application No. PCT/IB2019/055837 mailed on Feb. 24, 2020, 6 pages.

* cited by examiner

OPTICAL FILM INCLUDING INFRARED REFLECTOR AND MULTILAYER REFLECTIVE POLARIZER WITH CRYSTALLINE LOW INDEX LAYERS

CROSS REFERENCE TO RELATED APPLICATIONS

This application is a national stage filing under 35 U.S.C. 371 of PCT/IB2019/055837, filed Jul. 9, 2019, which claims the benefit of U.S. Provisional Application No. 62/699,459, filed Jul. 17, 2018, the disclosure of which is incorporated by reference in its/their entirety herein.

BACKGROUND

Multilayer reflective polarizes are optical films generally formed of alternating polymer layers, oriented such that the difference in refractive indices between the alternating polymer layers cause light of one orthogonal polarization to be substantially reflected, while the other is substantially transmitted. Through layer stack design and material selection, the multilayer reflective polarizer can polarize light over a desired range of visible and infrared wavelengths. Infrared reflectors reflect light in the infrared range, and may be transparent or substantially transparent in other wavelength ranges, such as the visible range.

SUMMARY

In one aspect, the present description relates to an optical film. The optical film includes a reflective polarizer portion and an infrared reflector portion disposed on the reflective polarizer portion. The reflective polarizer portion includes a plurality of alternating first polymer layers and second polymer layers. For at least on in-plane direction, the difference in refractive index between each of the first polymer layers and the second polymer layers is at least 0.04. For a second in-plane direction orthogonal to the at least one in-plane direction, the difference in refractive index between each of the first polymer layers and the second polymer layers of the reflective polarizer portion is less than 0.04. The infrared reflector portion includes a plurality of alternating third polymer layers and fourth polymer layers. The infrared reflector portion transmits less than 50% of normally incident unpolarized light averaged over 900-1200 nm. There is also no adhesive between the reflective polarizer portion and the infrared reflector portion.

In another aspect, the present description relates to a method of making an optical film. The method includes providing a cast film including a first portion including alternating first polymer layers and second polymer layers and a second portion including alternating third polymer layers and fourth polymer layers and orienting the cast film to form an optical film. The materials for the first polymer layers, the second polymer layers, the third polymer layers, and the fourth polymer layers are selected such that and orienting the cast film includes process conditions such that, after orienting the cast film, for at least one of a crossweb or downweb direction, the difference in refractive index between each of the first polymer layers and the second polymer layers of the optical film is at least 0.04. Further, for the other of the at least one of a crossweb or downweb direction, the difference in refractive index between each of the first polymer layers and the second polymer layers of the optical film is less than 0.04, and the second portion transmits less than 50% of normally incident unpolarized light averaged over 900-1200 nm.

DETAILED DESCRIPTION

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit.

Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A conventional multilayer film is made by co-extrusion of a large number, e.g. tens or hundreds of layers of two alternating polymers A, B, possibly followed by passing the multilayer extrudate through one or more multiplication die, and then stretching or otherwise orienting the extrudate to form a final film. The resulting film is typically composed of many of individual microlayers-hundreds or many hundreds-whose thicknesses and refractive indices are tailored to provide one or more reflection bands in desired region(s) of the spectrum, such as in the visible or near infrared. To achieve desired reflectivities with a reasonable number of layers, adjacent microlayers typically exhibit a difference in refractive index ($\Delta n_x$) for light polarized along the x-axis of at least 0.04. In some embodiments, materials are selected such that the difference in refractive index for light polarized along the x-axis is as high as possible after orientation. If reflectivity is desired for two orthogonal polarizations, then the adjacent microlayers also can be made to exhibit a difference in refractive index ($\Delta n_y$) for light polarized along the y-axis of at least 0.04.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

In certain embodiments, multilayer reflective polarizers may be useful in automotive applications. For example, multilayer reflective polarizers may be used on or near at least a portion of a vehicle windshield, a side window, or another otherwise transparent or translucent surface, such as industrial windows, architectural windows, skylights, room windows, or the like. This application differs significantly from traditional liquid crystal display applications, because—for safety reasons—a driver should still be able to observe the road or surrounding environment through the multilayer reflective polarizer, or have a minimally interrupted view through the surface. Further, other drivers or observers should not be dazzled or have their vision impaired by a bright reflection off the driver's windshield or another surface. The highly reflective (for one polarization state), high performance traditional reflective polarizer will not meet these requirements.

Further, previously known reflective polarizers are sensitive to the processing and environmental exposure involved in automotive and glass assembly and general use. For example, reflective polarizers may be used with, processed with, or laminated to polyvinyl butyral (PVB) for safety glass shatter resistance. A component of the PVB-based material can penetrate and degrade conventionally made and designed reflective polarizers under the high-temperature processing used to form laminated windshield components. As another example, polyethylene naphthalates—particularly polyethylene naphthalates (PEN) including NDC (dimethyl-2,6-naphthalenedicarboxylate)—which are used as polymers and/or copolymers in many commercially available reflective polarizers, will yellow when exposed to ultraviolet radiation. The vehicle or outdoor-exposed (e.g., for an external window) environment provides ample exposure to solar radiation, which may degrade the reflective polarizer over time. In such an environment, spontaneous large-size crystallization may also occur, developing haze in the reflective polarizer. In some embodiments, reflective polarizers described herein do not include polyethylene naphthalate. In some embodiments, reflective polarizers described herein do not contain naphthalene-2,6-dicarboxylic acid. In some embodiments, reflective polarizers described herein do not have a refractive index in any layer, along any direction, greater than 1.7, measured at 550 nm.

Multilayer optical films are typically formed from alternating layers of two different polymers. One layer is a layer capable of developing birefringence when oriented. Because almost all polymers used in the formation of multilayer optical films increase in refractive index when stretched, this layer is also typically known as the high index layer (or "high index optics" or HIO). The other layer of the alternating polymer layers is typically an isotropic layer, equal or less than the indices of refraction of the high index layer. For this reason, this layer is typically referred to as the low index layer (or "low index optics" or LIO). Conventionally, the high index layer is crystalline or semi-crystalline, while the low index layer is amorphous. This is at least based on the belief that in order to get high enough block axis reflectivity (based on the mismatch between the high index layer and the low index layer along a certain in-plane direction) and low enough pass axis reflectivity (based on the matching between the high index layer and the low index layer along a second, orthogonal in-plane direction), an amorphous material would be required.

It has now surprisingly been found that a multilayer reflective polarizer with both high index layers and low index layers that have some degree of crystallinity developed during stretching due to the low stretching temperature of polyethylene terephthalate are especially suited for these automotive applications. Additionally, it has surprisingly been found that multilayer reflective polarizers in which both the high index optics and the low index optics both develop asymmetric index of refraction increases through stretching can be useful in automotive application. In some embodiments, each of the high index layers and the low index layers may develop or have an in-plane birefringence of at least 0.04. In some embodiments, along one in-plane direction, the difference between the high index layers and the low index layers may be at least 0.04, but along a second, orthogonal in-plane direction, the difference may be less than 0.04. During certain intermediate stretching steps, certain multilayer optical films may have similar birefringent properties; however, these films were subsequently subject to a heat setting process that minimized the birefringence in at least one of the layers (typically the low index, or isotropic layer) in order to maximize the block axis (stretch axis) reflectivity, meaning the final film (i.e., the film in roll form or the converted film with at least four edges) did not exhibit these properties.

In some embodiments, the high index layers are selected to be polyethylene terephthalate (PET) and the low index layers are selected to be a copolyester of polyethylene terephthalate with cyclohexane dimethanol used as a glycol modifier (PETG, such as available from Eastman Chemicals, Knoxville, Tenn.). In some embodiments, the high index layers are selected to be PET and the low index layers are selected to be a 50:50 blend of PETG and PCTG (also a polyethylene terephthalate with cyclohexane dimethanol as a glycol modifier, but with twice the modifier as for PETG, available from Eastman Chemicals, Knoxville, Tenn.). In some embodiments, the high index layers are selected to be PET and the low index layers are selected to be a 33:33:33 blend of PETG, PCTG, and an "80:20" copolyester having 40 mol % terephthalic acid, 10 mol % isophthalic acid, 49.75 mol % ethylene glycol, and 0.25 mol % trimethyl propanol. Other copolyesters may be useful as or in low index layers described herein.

Reflective polarizers including materials such as the exemplary sets above surprisingly exhibit better inhibition of haze after high temperature exposure, due to the crystallization being developed gradually during processing rather than spontaneously (with accompanying larger crystal sites) during exposure to radiation or heat. Further, cosmetic and appearance issues such as microwrinkle or delamination appear to occur significantly less frequently with the crystalline materials combinations exemplified herein.

Shrinkage—particularly along the direction of greatest stretch—may be larger than conventional reflective polarizers. However, the amount of shrinkage can be controlled by a heat setting step, and in the manufacturing and assembly processes for automotive, a certain amount of shrinkage is desired.

Figure 1:
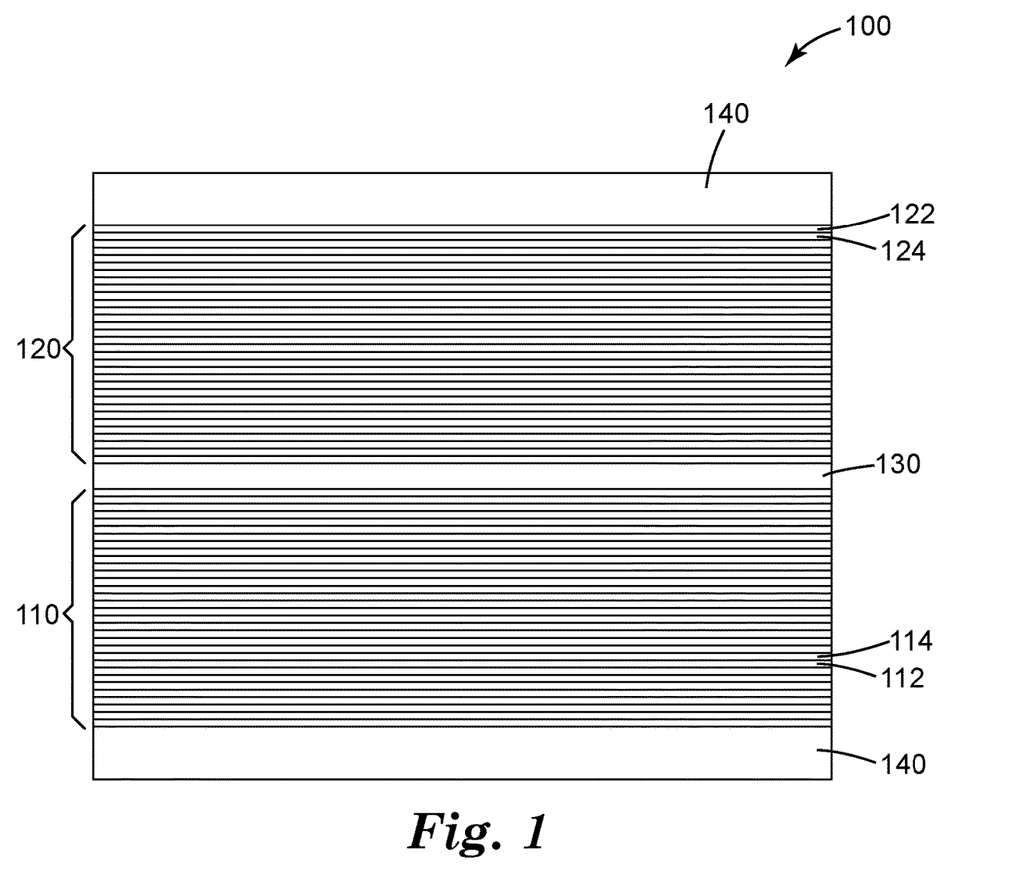
FIG. 1 is a side elevation cross-section of an optical film.

In some embodiments, multilayer optical films as described herein include two differently optical packets having different characteristic optical spectra, formed at the same time. FIG. 1 is a side elevation cross-section of an optical film. Optical film 100 includes reflective polarizer portion 110 and infrared reflector portion 120 separated by protective boundary layer 130 and including skin layers 140. Reflective polarizer portion includes alternating first polymer layers 112 and second polymer layers 114, and infrared reflector portion includes alternating third polymer layers 122 and fourth polymer layers 124. There is no adhesive between the reflective polarizer portion and the infrared reflector portion. Instead, the two portions—along with optional protective boundary layer 130 between the two portions and optional skin layers 140 protecting the alternating optical layers from processing and shear force of extrusion and roller contact—are coextruded and oriented or otherwise formed at the same time.

In typical film formation processes that include stretching or orientation, the optical axis of optical films made thereby will vary over the crossweb dimension due to asymmetries in the stretching process. The rate of variation will depend on the processing conditions. For films that would include a reflective polarizer portion laminated to an infrared reflector, these optical axes may not be precisely aligned, or even very closely aligned, as the portions of film may come from different web locations or simply may have been subject to different processing conditions. Advantageously, films having portions formed (extruded and stretched) at the same time will necessarily have excellent alignment of their optical axes.

Surprisingly, with suitable materials and processing conditions, films described herein may have a first portion that exhibits reflective polarizer characteristics (more polarization-sensitive reflection: reflecting light of a first polarization more than light having an orthogonal polarization) and a second portion that exhibits infrared reflector characteristics (less polarization-sensitive reflection; more mirror-like: reflecting light of either polarization or unpolarized light at a similar level). Typically, these films would utilize different stretching conditions, for example, stretching in primarily a single direction for a reflective polarizer versus stretching near-evenly in two orthogonal directions for an infrared reflector. In some embodiments, the film is stretched primarily or only in a crossweb direction.

Further, typically oriented multilayer films that lack symmetry in the thickness direction have a tendency to curl once released from tension (e.g., after conversion). This may be due to differences in shrinkage, in thermal expansion, and in hydroscopic expansion between the component materials. Film curl can be a significant problem in downstream processing or handling of the film. For example, if cut pieces of multilayer film are to be cut and laminated to glass, plastic, or sandwiched between two pieces of glass or plastic with an adhesive, such as PVB, film curl can make handling and process slower or less efficient, and may also reduce yield. Surprisingly, films described herein exhibit very low curl.

In some embodiments, reflective polarizer portion 110 includes a plurality of alternating first polymer layers and second polymer layers, where for at least one in-plane direction, the difference in refractive index between each of the first polymer layers and the second polymer layers of the reflective polarizer portion is at least 0.04. In some embodiments, for a second in-plane direction orthogonal to the at least one in-plane direction, the difference in refractive index between each of the first polymer layers and the second polymer layers of the reflective polarizer portion is less than 0.04. In some embodiments, infrared reflector portion 120 includes a plurality of alternating third polymer layers and fourth polymer layers. The infrared reflector portion, on its own, may transmit less than 50% of normally incident unpolarized light averaged over 900-1200 nm. In some embodiments, the infrared reflector portion, on its own, may transmit less than 40% of normally incident unpolarized light averaged over 900-1200 nm. In some embodiments, the infrared reflector portion, on its own, may transmit less than 30% of normally incident unpolarized light averaged over 900-1200 nm. In some embodiments, both the reflective polarizer portion and the infrared reflector portion have more than 200 layers, each.

One of either first polymer layers 112 and/or second polymer layers 114 may be or include the same material as one of either third polymer layers 122 and/or fourth polymer layers 124. In some embodiments, for the infrared reflector portion, the difference in refractive index between each of the third polymer layers and the fourth polymer layers is at least 0.04. In some embodiments, for two orthogonal in-plane direction, the difference in refractive index in between each pair of the third polymer layers and the fourth polymer layers is greater than the difference in refractive index between each pair of the first polymer layers and the second polymer layers along the second in-plane direction. In some embodiments, each of first polymer layers 112 and second polymer layers 114 of reflective polarizer portion 110 has an in-plane birefringence of at least 0.01. In some embodiments, each of the first polymer layers and the second polymer layers has an in-plane birefringence of at least 0.02. In some embodiments, each of the first polymer layers and the second polymer layers has an in-plane birefringence of at least 0.04. In some embodiments, each of the first polymer layers and the second polymer layers has an in-plane birefringence of at least 0.02. In some embodiments, reflective polarizer portion 110 transmits more than 90% of normally incident unpolarized light averaged over 900-1200 nm.

Optical films described herein may include one or more additional layers or coatings. For example, optical film 100 may further include a hardcoat. In some embodiments, optical film 100 may further include a retarder layer, such as a quarter-wave or half-wave retarder. In some embodiments, optical film 100 may include an optically clear adhesive layer and, in some embodiments, a protective paper or plastic liner. In some embodiments, optical film 100 may include an ultraviolet absorber component in any of its layers or in, for example, an adhesive.

When used on an automotive windshield or other vehicle window, the optical film may be disposed on the interior side of the glass, on the exterior side of the glass, or between two layers of laminated glass. In some embodiments, the glass may be curved. In some embodiments, when configured in a vehicle, the optical film may be oriented or configured such that it reflects more s-pol visible light than p-pol visible light. In some embodiments, when configured in a vehicle, the optical film may be oriented or configured such that it reflects more p-pol visible light than s-pol visible light.

Reflective polarizers with crystallinity in both the high index and the low index layers also perform better with respect to chemical resistance and permeability (edge ingress) of other materials.

Reflective polarizers as described herein are useful for automotive applications, but can also be used or suitable for certain polarizing beam splitter/view combiner applications. For example, for certain augmented reality displays or display devices, a generated and projected image may be superimposed over a wearer's frame of view. Many of the advantages that may be suitable for, for example, a heads up display for automotive applications, may be similarly desirable in these augmented reality applications.

EXAMPLES

A multilayer optical film designed to provide combined functions for windscreen display and solar blocking film is described herein. Thus, the single co-extruded film is required to simultaneously provide a p-polarization reflection in the visible for windscreen display and strong solar rejection in the near-infrared wavelengths. For comparison, the physical properties of a weak, polyester/co-polyester based reflective polarizer, and Ultra-Clear Solar Film (UCSF) (an infrared reflector), available from 3M Company (St Paul, MN, USA), are described in the Tables below.

Testing Methods

Machine direction (MD) labelling represents results for this multilayer optical film in the orientation of the extrusion direction. Transverse direction (TD) represents results for the film orthogonal to the extrusion direction. Dynamic mechanical analysis (DMA) is a testing technique and related analytical instrument that measures the physical properties of solids and polymer melts, reports modulus and damping, and is programmable to measure force, stress, strain, frequency and temperature. Thermomechanical analysis (TMA) is a common measurement of sample displacement (growth, shrinkage, movement, etc.) as a function of temperature, time and applied force. Traditionally, TMA is used to characterize linear expansion, glass transitions, and softening points of materials by applying a constant force to a specimen while varying temperature.

TABLE 1

Measured properties for UCSF

| Measurement | Orientation | Result | Unit | Replicates | Test Methods |
|---|---|---|---|---|---|
| Mechanical | | | | | |
| Tensile Strength | MD | 158 | MPa | 5 | ASTM D882: |
| | TD | 186 | MPa | 5 | 0.5 mm/(mm * min) |
| Elongation at break | MD | 138 | % | 5 | strain rate |
| | TD | 99 | % | 5 | |
| Storage Modulus (25° C.) | MD | 3.4 | GPa | 3 | DMA: (2° C./minute, 0.1% strain, 1 Hz) |
| | TD | 4.1 | GPa | 3 | |
| Storage Modulus (85° C.) | MD | 2.1 | GPa | 3 | |
| | TD | 2.6 | GPa | 3 | |
| Thermal | | | | | |
| Shrinkage (85° C./ 30 minutes) | MD | .28 | % | 3 | TMA: (5° C./minute, hold 85° C. for 30 minutes, 25° C. reference, initial RH<20%, 24 mm length |
| | TD | .18 | % | 3 | |
| Coefficient of Thermal Expansion (0-85° C.) | MD | 38.6 | $10^{-6}$/° C. | 3 | TMA: (5° C./minute, 120 to −25° C., 25° C. reference, initial RH<20%, 24 mm length |
| | TD | 28.6 | $10^{-6}$/° C. | 3 | |
| $T_g$ | N/A | 95 | ° C. | 6 | DMA: (2° C./minute, 0.1% strain, 1 Hz, storage modulus onset temperature) |
| Hygroscopic | | | | | |
| Coefficient of hygroscopic expansion | MD | 13.2 | ppm/% RH | 2 | DMA: 25° C., 20%-80% RH steady-state |
| | TD | 11.3 | ppm/% RH | 2 | |

TABLE 2

Measured properties for single packet, p-polarization reflective polarizer

| Measurement | Orientation | Result | Unit | Replicates | Test Methods |
|---|---|---|---|---|---|
| Thermal measurements for first, single packet, reflective polarizer having low index layer of PETg GN071 (from Eastman chemicals). | | | | | |
| Shrinkage (150° C./ 30 minutes) | MD | 1.97 | % | 2 | TMA: 5° C./minute ramping, hold 150° C. for 30 minutes, 25° C. reference, initial RH<20%, 24 mm length |
| | TD | 1.87 | % | 2 | |
| Coefficient of Thermal Expansion (95-0° C.) | MD | 81.5 | $10^{-6}/°$ C. | 2 | TMA: 5° C./minute ramping, 170° C. to −20° C., 25° C. reference, initial RH<20%, 24 mm length |
| | TD | 11.2 | $10^{-6}/°$ C. | 2 | |
| Coefficient of Thermal Expansion (125-95° C.) | MD | 104.1 | $10^{-6}/°$ C. | 2 | TMA: 5° C./minute ramping, 170° C. to −20° C., 25° C. reference, initial RH<20%, 24 mm length |
| | TD | 19.5 | $10^{-6}/°$ C. | 2 | |
| Thermal measurements for second, single packet reflective polarizer having F-ratio of 0.75 and the low index layer made up of a 33:33:33 blend of Polyethylene Terephthalate Glycol (PETG) GN071 from Eastman, VM318D PCTg from Eastman, and 80:20 CoPET. The 80:20 CoPET is a pelletized an amorphous copolyester comprised of a molar ratio of the following: 40 mol % terephthalic, 10 mol % isophthalic, 49.75 mol % ethylene glycol, 0.25 mol % trimethyl propanol | | | | | |
| Shrinkage (150° C./ 30 minutes) | MD | 2.03 | % | 2 | TMA: 5° C./minute ramping, hold 150° C. for 30 minutes, 25° C. reference, initial RH<20%, 24 mm length |
| | TD | 1.81 | % | 2 | |
| Coefficient of Thermal Expansion (95-0° C.) | MD | 80.1 | $10^{-6}/°$ C. | 2 | TMA: 5° C./minute ramping, 170° C. to −20° C., 25° C. reference, initial RH<20%, 24 mm length |
| | TD | 10.3 | $10^{-6}/°$ C. | 2 | |
| Coefficient of Thermal Expansion (125-95° C.) | MD | 104.9 | $10^{-6}/°$ C. | 2 | TMA: 5° C./minute ramping, 170° C. to −20° C., 25° C. reference, initial RH<20%, 24 mm length |
| | TD | 24.0 | $10^{-6}/°$ C. | 2 | |

In Tables 1 and 2, the coefficients of thermal and hygroscopic expansion are shown for biaxially-oriented UCSF and also for the uniaxially-oriented p-pol reflective polarizer. The properties are very different in the machine direction compared to transverse direction for the reflective polarizer, and yet very similar in both directions for the biaxial film.

Example 1

A multifunctional windscreen display and solar film was prepared as follows. Two independent multilayer packets of 325 layers each were coextruded using a feedblock system as described in U.S. Pat. No. 9,630,356 (Neavin et al.), which includes skin layers, draw ratios and tentering processes suitable for the coextrusion process used for these examples. The "f-ratio," as described herein, refers to the ratio of the optical thickness of a constituent layer with highest optical index, "A", to the optical thickness of the complete optical repeat unit (including of layers A+B).

Three polymers were used for the optical layers. The first polymer (first optical layers) was purified terephthalic acid (PTA) based polyethylene terephthalate with an intrinsic viscosity of 0.72. The second polymer (second optical layers) was polyethylene terephthalate glycol (PETG) GN071 from Eastman Chemical (Kingsport, TN, USA). The third polymer was CA-24 co-PMMA available from Plaskolite (Columbus, OH, USA). The first packet used only the first and second polymers, namely PET and PETG. The second packet used the first and third polymers namely, PETG and co-PMMA. The ratio of the feed rate in the first packet of the first polymer to the second polymer was chosen to make the optical layers have an f-ratio of 0.50. The ratio of the feed rate in the second packet of the first polymer to the third polymer was chosen to make the optical layers have a f-ratio of 0.496. The polymer used for the skin layers was EASTAPAK PET 7352 available from Eastman Chemical (Kingsport, TN, USA). The materials were fed from separate extruders to a multilayer coextrusion feedblock, in which they were assembled into two packets of 325 alternating optical layers, plus a thicker protective boundary layer of the first optical layers, on each side, for a total of 654 layers. The skin layers of the first optical layer material were added to the construction in a manifold specific to that purpose, resulting in a final construction having 656 layers. The multilayer melt was then cast through a film die onto a chill roll, in the conventional manner for polyester films, upon which it was quenched. The cast web was then stretched in a commercial scale linear tenter at a draw ratio approximately 7:1 and a temperature of 228° F. in the stretching section. The heat set section had a temperature of 350° F.

Before this film was produced there was concern about the hydrodynamic flow stability for this process being insufficient for producing perfectly parallel layers with flat interfaces and no layer break-up. However, the resulting material choices for the three polymer materials, however, provided compatible rheologies for this co-extrusion process to provide a generally flat, two packet, uniaxially stretched multilayer optical film.

The multilayer film of Example 1 (without coatings) was wound on a roll with an outside diameter of about 15 inches with the first packet on the outside of the roll. Forty-nine days later the film was evaluated for curl by cutting a 3 inch by 3 inch square of film with one edge in the MD and one edge in TD. The film was from the outside wraps of the roll and half way between the edges of the film. The square of film was placed on a flat surface with packet 1 down and the height each of the corners was measured to be 1.5 millimeters. The edges in the MD were straight while the edges in the TD were curved providing the 1.5 millimeters of corner lift. Sheets of the film were easily handled and curl was not an issue when creating laminated glazing using the multilayer film.

Figure 3:
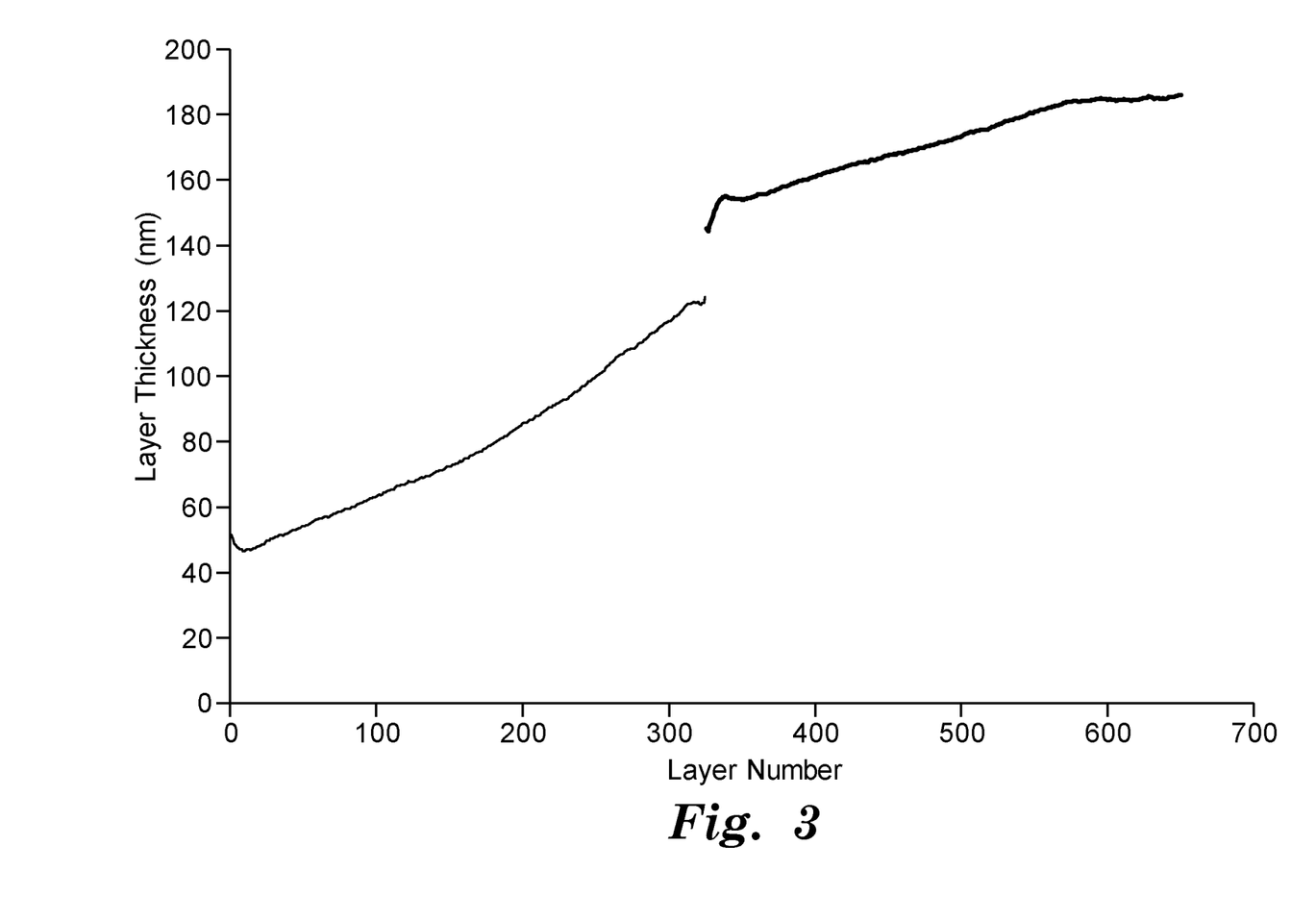
FIG. 3 is a graph showing the layer profile for the film of Example 1.

The layer thickness profile as measured by Atomic Force Microscopy is shown in FIG. 3. This plot shows the thicknesses of the individual layers in each 325-layer packet.

Optical Test and Shrinkage Test Results

Figure 2:
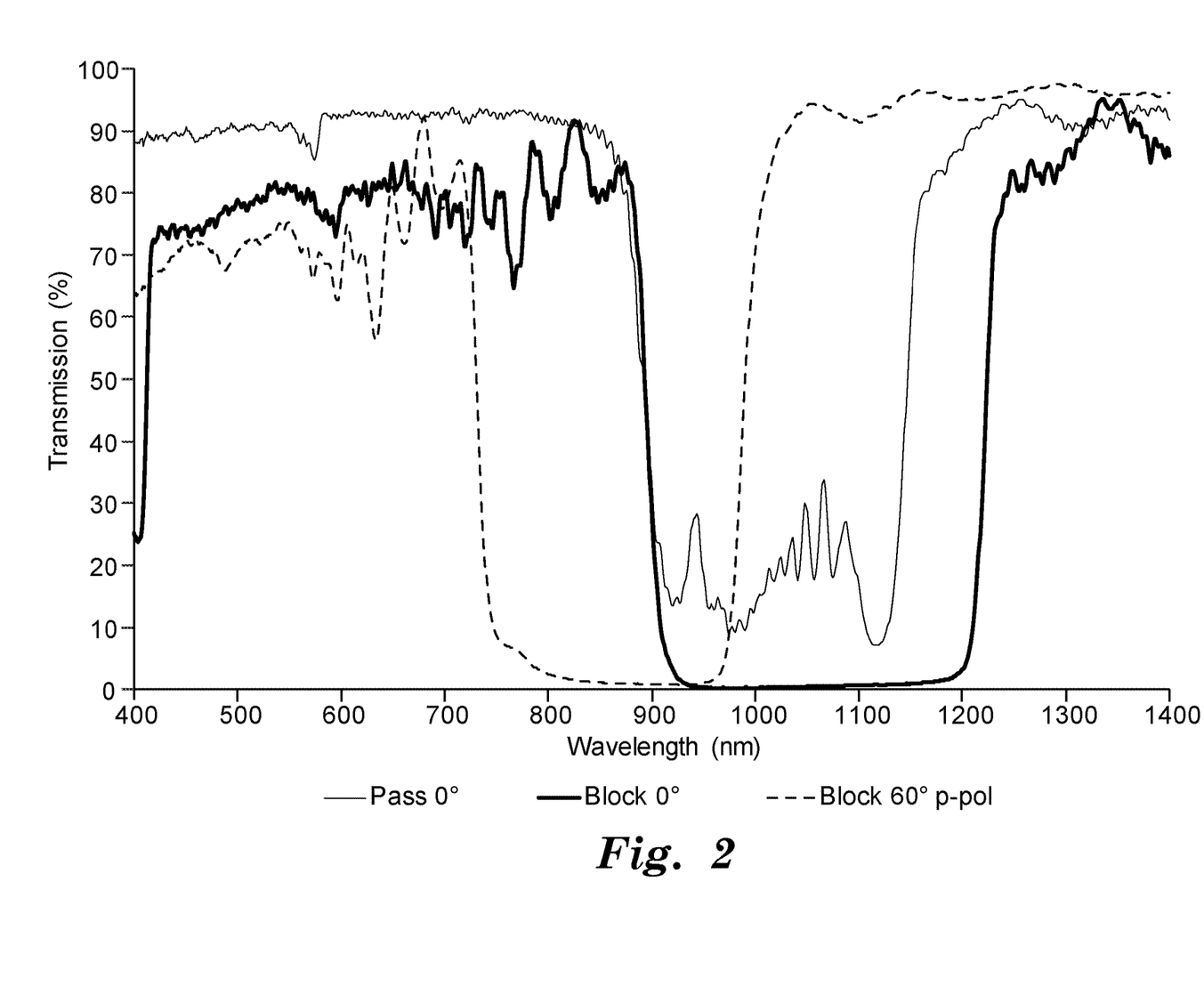
FIG. 2 is a graph showing pass and block state transmission spectra for the film of Example 1.

The layer profile, first polymer, second polymer, and third polymer materials, and chosen process conditions led to the resulting pass and block state transmission spectra measured by conventional spectrometer and shown in FIG. 2. This film has a resulting physical thickness as measured by a capacitance gauge of approximately 86.9 μm.

The shrinkage measured at 302° F. was 2.74% MD and 2.77% TD providing sufficiently isotropic behavior for this application.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical film, comprising:
a reflective polarizer portion; and
an infrared reflector portion disposed on the reflective polarizer portion;
wherein the reflective polarizer portion includes a plurality of alternating first polymer layers and second polymer layers;
wherein for at least one in-plane direction, the difference in refractive index between each of the first polymer layers and the second polymer layers of the reflective polarizer portion is at least 0.04;
wherein for a second in-plane direction orthogonal to the at least one in-plane direction, the difference in refractive index between each of the first polymer layers and the second polymer layers of the reflective polarizer portion is less than 0.04;
wherein the infrared reflector portion includes a plurality of alternating third polymer layers and fourth polymer layers;
wherein the infrared reflector portion exhibits less polarization-sensitive reflection compared to the reflective polarizer portion and transmits less than 50% of normally incident unpolarized light averaged over 900-1200 nm;
wherein there is no adhesive between the reflective polarizer portion and the infrared reflector portion.

2. The optical film of claim 1, wherein at least one of either the first polymer layers and the second polymer layers include the same material as at least one of either the third polymer layers and the fourth polymer layers.

3. The optical film of claim 1, wherein none of the first polymer layers, the second polymer layers, the third polymer layers, or the fourth polymer layers include polyethylene naphthalate.

4. The optical film of claim 1, wherein for two orthogonal in-plane directions, the difference in refractive index between each of the third polymer layers and the fourth polymer layers is at least 0.04.

5. The optical film of claim 1, wherein for two orthogonal in-plane directions, the difference in refractive index in-between each of the third polymer layers and the fourth polymer layers is greater than the difference in refractive index between each of the first polymer layers and the second polymer layers along the second in-plane direction.

6. The optical film of claim 1, wherein each of the first polymer layers and the second polymer layers of the reflective polarizer portion has an in-plane birefringence of at least 0.02.

7. The optical film of claim 1, wherein the reflective polarizer portion transmits more than 90% of normally incident unpolarized light averaged over 900-1200 nm.

8. A laminate, comprising:
an optical film as in claim 1; and
a glass layer;
wherein the optical film is laminated to the glass.

9. The laminate of claim 8, wherein the glass is an automotive windshield.

10. The laminate of claim 8, wherein the glass is a vehicle window.

11. A vehicle, comprising the laminate of claim 10.

12. The vehicle of claim 11, wherein the optical film is disposed such that the reflective polarizer portion of the optical film reflects more s-pol visible light than p-pol visible light.

13. The vehicle of claim 11, wherein the optical film is disposed such that the reflective polarizer portion of the optical film reflects more p-pol visible light than s-pol visible light.

14. The laminate of claim 8, wherein the optical film is laminated to the glass with an adhesive including polyvinyl butyral.

15. The laminate of claim 8, wherein the optical film is laminated to the glass with an optically clear adhesive including a UV absorber.

16. The laminate of claim 8, further comprising a second glass layer, wherein the optical film is disposed between the glass layer and the second glass layer.

17. A method of forming an optical film, comprising:
providing a cast film including a first portion including alternating first polymer layers and second polymer layers and a second portion including alternating third polymer layers and fourth polymer layers;
orienting the cast film to form an optical film;
wherein the materials for the first polymer layers, the second polymer layers, the third polymer layers, and the fourth polymer layers are selected such that orienting the cast film includes process conditions such that, after orienting the cast film,
for at least one of a crossweb or downweb direction, the difference in refractive index between each of the first polymer layers and the second polymer layers of the optical film is at least 0.04;
for the other of the at least one of a crossweb or downweb direction, the difference in refractive index between each of the first polymer layers and the second polymer layers of the optical film is less than 0.04; and
the second portion exhibits less polarization-sensitive reflection compared to the first portion and transmits less than 50% of normally incident unpolarized light averaged over 900-1200 nm.

18. The method of claim 17, wherein orienting the cast film to form an optical film includes stretching the film only in a crossweb direction.

19. The method of claim 17, wherein at least one of either the first polymer layers and the second polymer layers, and at least one of either the third polymer layers and the fourth polymer layers, includes the same material.

* * * * *

UNITED STATES PATENT AND TRADEMARK OFFICE
CERTIFICATE OF CORRECTION

| | |
|---|---|
| PATENT NO. | : 12,253,702 B2 |
| APPLICATION NO. | : 17/260413 |
| DATED | : March 18, 2025 |
| INVENTOR(S) | : Adam D. Haag |

It is certified that error appears in the above-identified patent and that said Letters Patent is hereby corrected as shown below:

In the Claims

<u>Column 14</u>
Lines 4-5, Claim 5, delete "in-between" and insert -- between --, therefor.

Signed and Sealed this
Seventh Day of October, 2025

John A. Squires
*Director of the United States Patent and Trademark Office*